United States Patent [19]

Fushimoto

[11] Patent Number: 5,224,041
[45] Date of Patent: Jun. 29, 1993

[54] ELECTRONIC DICTIONARY FOR OUTPUTTING WORDS IN THE OPPOSITE ORDER IN WHICH THEY ARE SEARCHED

[75] Inventor: Hideo Fushimoto, Tokyo, Japan

[73] Assignee: Canon Kabushiki Kaisha, Tokyo, Japan

[21] Appl. No.: 719,092

[22] Filed: Jun. 20, 1991

Related U.S. Application Data

[63] Continuation of Ser. No. 304,266, Jan. 31, 1989, abandoned.

[30] Foreign Application Priority Data

Feb. 2, 1988 [JP] Japan .................. 63-021321

[51] Int. Cl.⁵ .............................. G06F 15/38
[52] U.S. Cl. ...................... 364/419; 434/156
[58] Field of Search ............ 364/419; 434/156; 382/46

[56] References Cited

U.S. PATENT DOCUMENTS

| | | | |
|---|---|---|---|
| 4,159,536 | 6/1979 | Kehoe | 364/900 |
| 4,590,560 | 5/1986 | Sado | 364/419 |
| 4,627,020 | 12/1986 | Anderson et al. | 382/46 |
| 4,688,192 | 5/1987 | Yoshimura | 364/419 |
| 4,689,824 | 8/1987 | Michell et al. | 382/46 |
| 4,740,913 | 4/1988 | Washizuka et al. | 364/419 |
| 4,742,481 | 5/1988 | Yoshimura | 364/419 |
| 4,758,955 | 7/1988 | Chen | 364/419 |
| 4,796,185 | 1/1989 | Yoshimura | 364/419 |
| 4,837,595 | 6/1989 | Pruett et al. | 382/46 |
| 4,947,370 | 8/1990 | Sugitani | 364/419 |

FOREIGN PATENT DOCUMENTS

55-10694  1/1980  Japan .

*Primary Examiner*—Gail O. Hayes
*Attorney, Agent, or Firm*—Fitzpatrick, Cella, Harper & Scinto

[57] ABSTRACT

An electronic dictionary includes a keyboard for inputting first language information, a first memory in which second language information indicative of a grammatical classification corresponding to the input first language information is stored, a first operator for instructing the outputting of second language information stored in the first memory, a second memory for storing operation information for operating the first operator, a second operator for instructing the outputting of the second language information in an order opposite from the order in which the second language information is instructed to be output by the first operator on the basis of the operation information stored in the second memory, and a controller for searching the first memory to thereby output the second language information corresponding to the first language information input by the keyboard, for sequentially outputting a plurality of second language information corresponding to the first language information in response to the operation of the first operator, and for thereafter outputting the second language information output by the operation of the first operator in response to the operation of the second operator in the opposite order.

15 Claims, 4 Drawing Sheets

ELECTRONIC DICTIONARY FOR OUTPUTTING WORDS IN THE OPPOSITE ORDER IN WHICH THEY ARE SEARCHED

This application is a continuation of application Ser. No. 304,266 filed Jan. 31, 1989, now abandoned.

BACKGROUND OF THE INVENTION

1. Field of the Invention

The present invention relates to an electronic dictionary and, more particularly, to an electronic dictionary which receives first language information and outputs second language information corresponding to the first language information.

2. Related Background Art

Hitherto, an electronic dictionary, an electronic translating apparatus, or the like have been known. In such a kind of apparatus, for instance, Japanese words, sentence, or the like are input and the words or a sentence translated in foreign language such as English or the like are displayed and output. The process to convert the first language information into the second language information is executed by a microprocessor by searching a memory in which the first and second languages are correspondingly stored with respect to the first language information. As a method of outputting the language information, a display output such as a liquid crystal display or the like is provided. However, a method using a voice output or the like is also considered. Therefore, a consideration will now be giving to an electronic dictionary constructed as an English-/Japanese Dictionary. As the simplest electronic dictionary, there has been known a dictionary in which an English word is input and one Japanese word having the meaning corresponding to the input English word is output. However, there is also considered an apparatus in which the information relative to the input English word, for instance, if it is a verb, its conjugation, synonyms, antonyms, and the like are output. For example, such an apparatus has also been disclosed in U.S. Pat. No. 4,159,536 issued to Kehoe et al. and U.S.S.N. 878,748.

In the case of outputting such relative information, there is considered a method whereby information indicating whether the relative information exists and is stored in the memory and when certain language information is searched and output, the information relative to the language information is searched and output in accordance with a predetermined operation. On the other hand, there is also considered a method whereby if the searched language information has relative information, such information is output by again executing a predetermined operation.

According to such a method of tracing the tree of relative information, the relative information can be successively searched by one operation without needing the troublesome operation to turning over the pages of an ordinary dictionary one by one, so that it is very convenient. However, on the contrary, in a system which has conventionally been considered, the search history is limited to the information just previously searched. Therefore, there are problems such that the operator cannot know which word he or she wanted to first search and the relation between relative words which are sequentially output becomes unclear.

SUMMARY OF THE INVENTION

It is a first object of the present invention, in the case where information relative to searched language information has been successively extracted from a memory by executing predetermined operations, to store the search history, so that the relative information which has been output so far can be sequentially output in the opposite order.

A second object of the invention is to execute executing a special operation to return displayed information from the last relative information extracted to the first searched language information in a lump such that the first language information can be output.

DETAILED DESCRIPTION OF THE PREFERRED EMBODIMENT

The present invention will be described in detail hereinbelow on the basis of an embodiment shown in the diagrams. An apparatus which will be explained hereinbelow relates to an electronic dictionary which can be used as an English/Japanese dictionary.

Figure 1:
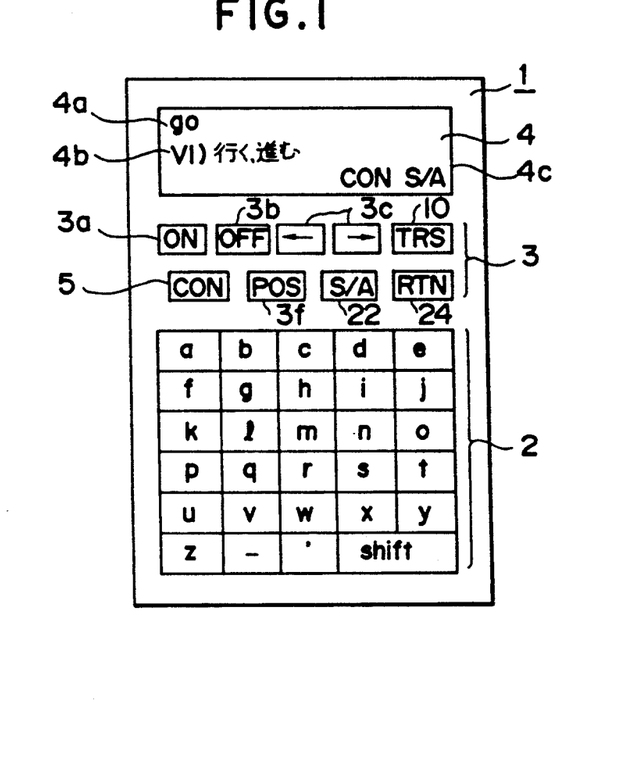
FIG. 1 is a plan view of an electronic dictionary to which the present invention is applied.

FIG. 1 shows a plan view of an electronic dictionary to which the invention is applied. A keyboard and a display device 4 are provided on the upper surface of an apparatus main body 1.

The keyboard is divided into input keys 2 and function keys 3.

The input keys 2 are constructed by arranging alphabetical character keys like a matrix of 6×5 as shown in the diagram. However, the key arrangement is not limited to it but can be arbitrarily set.

The display device 4 has region 4a to display an input English word and a region 4b to display a Japanese word corresponding to the input English word and its part of speech.

The function keys 3 have the following keys.

Reference numerals 3a and 3b denote keys to instruct to turn on and off a power source of the apparatus. Keys 3c on which arrows indicative of the left and right directions are written are cursor keys and are used to control the position of an editing cursor which is displayed on the display device 4.

A translation key 10 (hereinafter, referred to as a TRS key 10) is used to instruct the process to translate an input English word to a Japanese word.

As shown in the diagram, when an English word "go" is input and translated by depressing the TRS key 10, part of speech information of "vi (intransitive verb)" and a translated word of "行く, 進む" ("Iku, Susumu") are output on the display device 4.

In this state, by operating a key 3f labeled "POS" (part of speech), if other parts of speech regarding the searched and output word exist, they can be output.

Further, as shown by reference numeral 4c, there is indicated that relative information such as conjugation, synonyms, antonyms, and the like exists for the output information and can be output.

In this state, by pressing a conjugation key 5 (hereinafter, referred to as a CON key 5) and a synonyms and/or antonyms key 22 (hereinafter, referred to as an S/A key 22), the conjugation and S/A words of the input English word are output and displayed on the display device 4 as shown in FIGS. 2A to 2D.

Figure 2A:
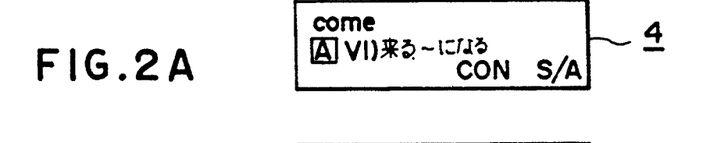
FIGS. 2A to 2D are explanatory diagrams showing display states of a display device in FIG. 1.

When the S/A key 22 is depressed in the state shown in FIG. 1, an antonyms word "come" is output as shown in FIG. 2A.

Even in the case of FIG. 2A, the part of speech, the corresponding Japanese word, its conjugation, and the presence or absence of the S/A information are also displayed in a manner similar to FIG. 1. Further, by displaying a character "A" surrounded by a square, it is shown that the word is the antonyms of the word which was searched before.

Figure 2B:
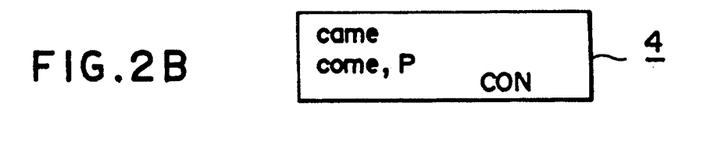

The output state is returned to the state shown in FIG. 1 by again depressing the S/A key 22. However, since "come" is an irregular verb and has a conjugation, the presence of conjugation and S/A information is displayed. By depressing the CON key 5, the past form "came" of "come" is output as shown in FIG. 2B. The presence of a conjugation is further shown here.

The outlines of the construction and processes described so far are substantially the same as those in the conventional apparatus. Hitherto, for instance, since the output state cannot be returned from the state of FIG. 2B to the display state of "go" in FIG. 1 which was first searched, various kinds of problems as mentioned above occur.

In consideration of the above point, in the embodiment, a return key 24 (hereinafter, referred to as an RTN key 24) is provided for the function keys 3. For instance, by depressing the RTN key 24 in the state of FIG. 2A the output state can be returned to the display state of FIG. 1. In the state of FIG. 2B, the output state can be returned to the display state of FIG. 1 by operating the RTN key 24 twice.

Figure 2C:
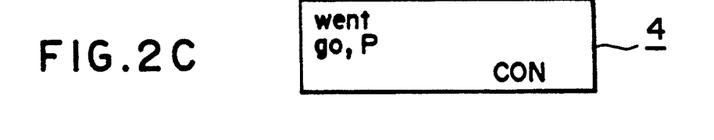
Figure 2D:
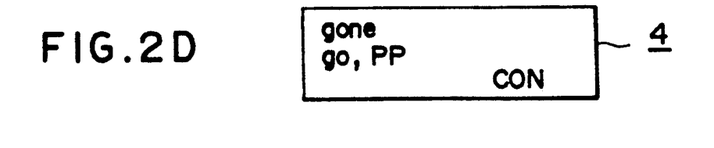

Therefore, by further depressing the CON key 5 in the state of FIG. 1, the past form "went" of "go" can be output as shown in FIG. 2C. The state of FIG. 2C shows the present of the conjugation. By again depressing the CON key 5 in this state, the past participle "gone" of "go" is output as shown in FIG. 2D.

By providing the RTN 24, it is possible to know through which background the present word was output. The foregoing problems can be avoided.

The construction to realize the foregoing operations and functions will now be described in detail hereinbelow.

Figure 3:
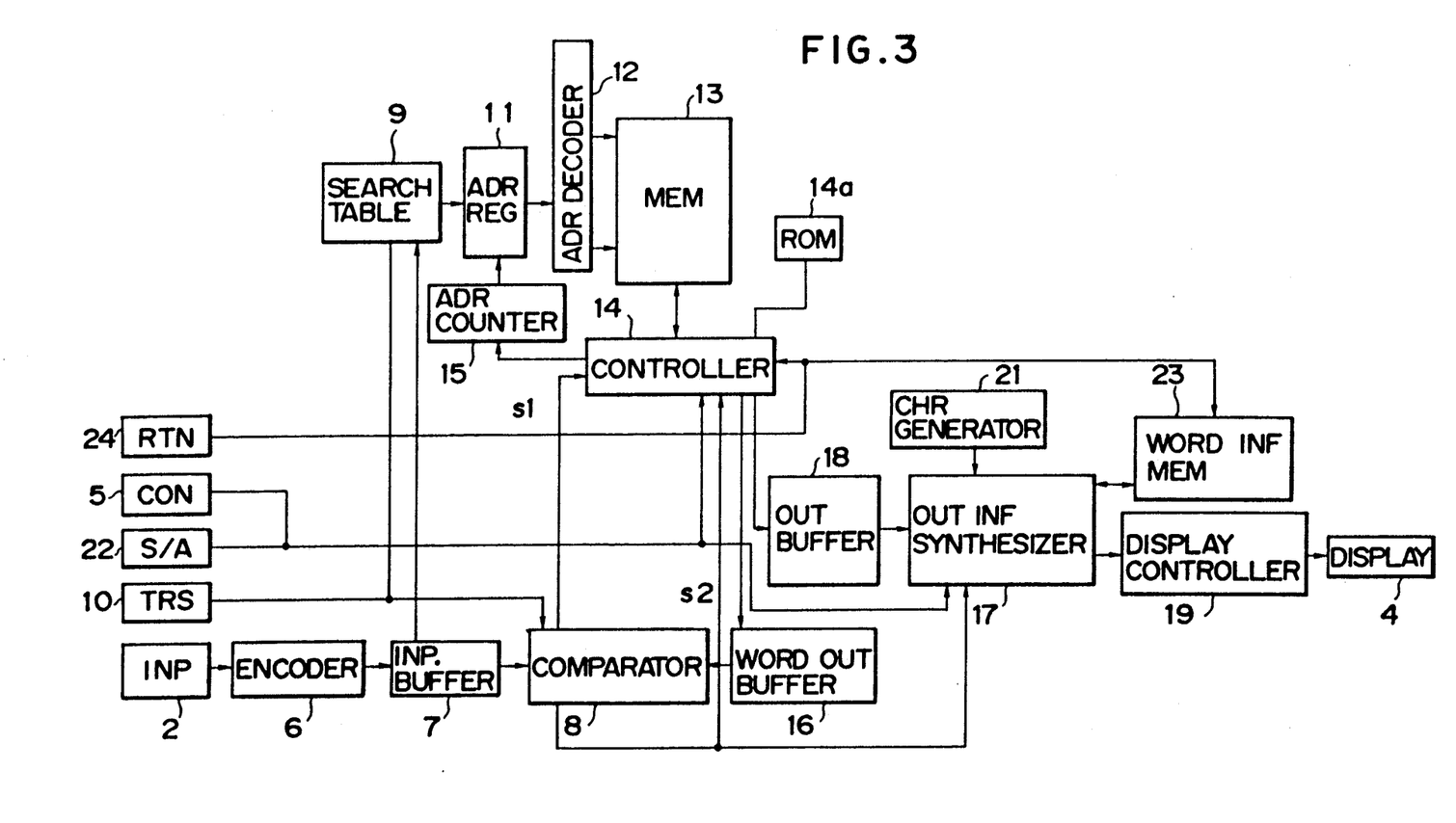
FIG. 3 is a block diagram of a control system of an apparatus of FIG. 1.

FIG. 3 shows a construction of a control system of the apparatus shown in FIG. 1.

The information (English word) input from the input keys 2 in FIG. 1 is converted into the character code through an encoder 6 and stored into a key input buffer 7. The input information stored in the key input buffer 7 is output to a comparator 8 and a search table 9.

The operation of the apparatus is controlled by a controller 14 consisting of a microprocessor or the like. A control program (which will be explained hereinlater) of the controller 14 is stored in an ROM 14a.

The search table 9 consists of a table such as an ROM or the like. An address in a memory 13 to start the searching operation is determined in accordance with the head character information of the English word stored in the key input buffer 7 in correspondence to the operation of the TRS key 10. The word information to be searched from the memory 13 is output on the basis of this address.

A storage structure of the memory 13 is shown in FIGS. 4A to 4E.

Figure 4A:
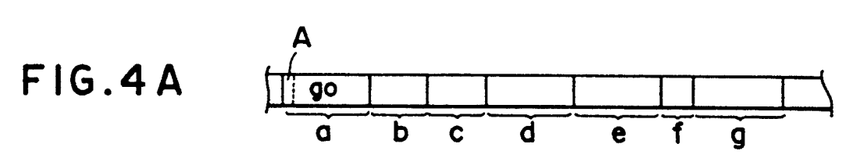
FIGS. 4A to 4E are explanatory diagrams showing a storage structure of a memory in FIG. 3.

FIG. 4A shows a storage state of the information regarding an English word "go". This information is sequentially stored in accordance with the order from the information address A as a head. In FIG. 4A, reference character a denotes the English word "go" as a header. After that, the conjugation b (in this case, "went", "gone"), and S/A information c (in this case, "come") are stored.

Further, the output word information d and e (in this case, "行く" (Iku), "進む" (Susumu)) are stored. Subsequently, a header g of t English word follows through a predetermined delimiter code f.

Figure 4B:
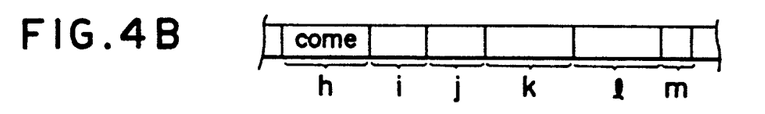

FIG. 4B shows a storage state of an English word "come".

With respect to this word, a header h, conjugations i and j ("came", "come"), and output words k and l are stored and a delimiter code m is finally stored.

Figure 4C:
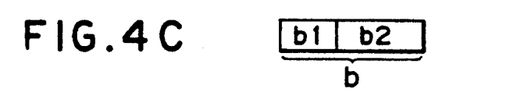
Figure 4D:
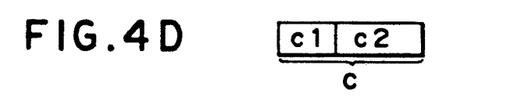
Figure 4E:
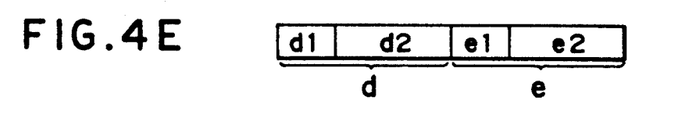

FIGS. 4C to 4E show the details of the information indicated by reference characters b, c, and d in FIG. 4A, respectively. In the diagram, reference characters $b_1$, $c_1$, $d_1$, and $e_1$ denote delimiter codes each of which indicates a boundary between the information which has previously been stored and next information which will be stored after it. Subsequent to the delimiter codes, the conjugation and S/A information $b_2$, $c_2$, $d_2$, and $e_2$ (corresponding to the information address A in FIG. 4A) are stored. By storing the delimiter codes in this manner, by interposing the delimiter codes, objective information can be extracted by outputting the information between the delimiter codes.

The address control in the reading/writing operations of the memory 13 is executed by the search table 9 and controller 14 through an address counter 15, an address register 11, and an address decoder 12.

The word information which is output from the memory 13 is input to a word output buffer 16 through the controller 14 and given to the comparator 8.

The comparator 8 discriminates whether the word input to the key input buffer 7 coincides with the word which is output from the memory 13 or not. The result of the discrimination is output to the controller 14 through a signal line $s_1$ (dissidence signal) or $s_2$ (coincidence signal).

When the coincidence signal is received from the comparator 8 through the signal line $s_2$, the controller 14 reads out the information regarding the same word as the input word from the memory 13 and sends to an output information synthesizer 17 through an output buffer 18.

The output information synthesizer 17 forms display information consisting of a dot matrix or the like to be output to the display device 4 by using a character generator 21 consisting of a character generator or the like.

The display information is output to the display device 4 through a display controller 19.

The S/A key 22 is connected to the controller 14 and output information synthesizer 17. On the other hand, the RTN key 24 is connected to the controller 14 and a word information memory 23.

The word information memory 23 is provided to return the output state to the display state of the information of the word which has been searched so far after the conjugation of S/A information had been output. The memory 23 consists of an RAM or the like. When the output of the conjugation or S/A information is designated by the S/A key 22, the searched information addresses A are sequentially stored into the memory 23.

The operation in the foregoing construction will now be described in detail.

Figure 5:
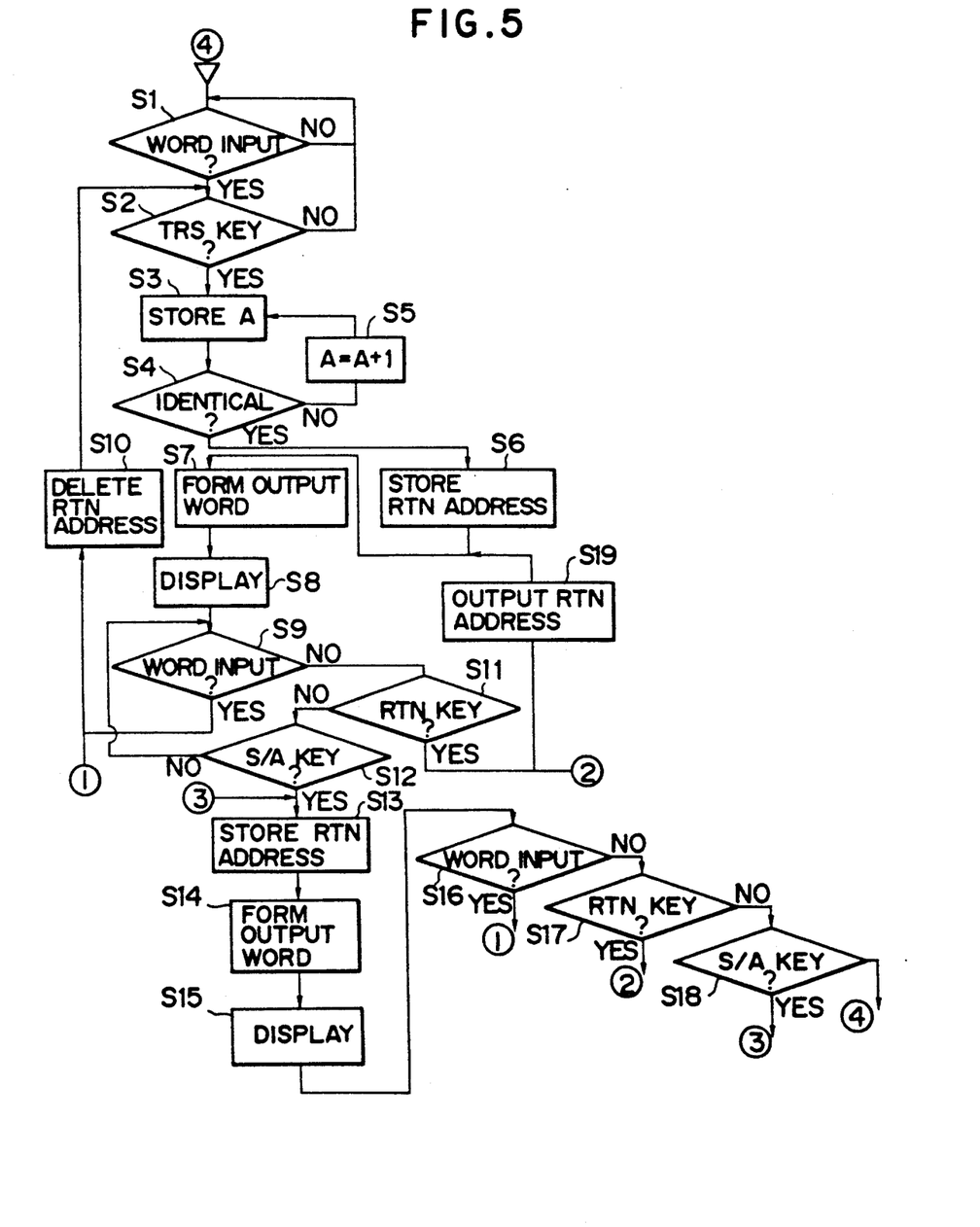
FIG. 5 is a flowchart for a control procedure of a controller in FIG. 3.

FIG. 5 shows a control procedure of the controller 14 in FIG. 3. In FIG. 5, it is assumed that the flow indicated by the same reference numeral is continued at this position.

In the case of outputting a Japanese translated word of an English word, a desired English word is first received by the input keys 2 in step S1.

In step S2, a check is made to see if the TRS key 10 has been depressed or not. If NO in steps S1 and S2, the processes in these steps are repeated.

After an English word was input, when the TRS key 10 is depressed, the input word is searched from the memory 13 in the loop of steps S3 to S5. At this time, the information address A in the memory 13 to be searched is determined by the search table 9 on the basis of the head character of the word stored in the key input buffer 7 as mentioned above. The word (the header a in FIG. 4A) is sequentially output from the address and compared with the input word in the key input buffer 7 by the comparator 8 in steps S4. When the output word from the memory 13 does not coincide with the input word, the information address A in the memory 13 is increased by "1" in step S5 and the processing routine is returned to step S3.

When the same header word as the input word is found out, step S6 follows.

In step S6, the information address indicative of the head of the word which was first found out is stored into the word information memory 23 as a return (RTN) address to which the process is returned.

In step S7, the relevant word, part of speech information, and information indicative of the presence or absence of the output word conjugation and S/A information are read out of the memory 13 and given to the output information synthesizer 17 through the output buffer 18. The synthesizer 17 forms the output information to be displayed as mentioned above and gives to the display device 4 through the display controller 19.

In step S8, the information output from the synthesizer 17 is displayed by the display device 4.

In step S9, a check is made to see if the next word has been input or not. If YES, the RTN address (that is, information address A of the word which was first searched on the basis of the input word) stored in the word information memory 23 is deleted in step S10. Then, the processing routine is returned to step S2 and the above operations are repeated.

On the contrary, when the next word is not input in step S9, step S11 follows and a check is made to see if the RTN key 24 has been depressed or not. If YES in step S11, the RTN address stored in step S6 is output from the word information memory 23 and given to the controller 14 in step S19. The controller 14 reads out the information from the memory 13 on the basis of the RTN address given. Then, the information is given to the synthesizer 17 in step S7.

If NO in step S11, a check is made in step S12 to see if the S/A key 22 has been depressed or not. If YES in step S12, the RTN address is stored into the word information memory 23 in step S13 in a manner similar to step S6. At this time, a current RTN address is stored in a memory area subsequent to the area for the previous RTN address in the word information memory 23.

In the next step S14, the address (e.g., c in FIG. 4A of the S/A information is read out from the information of the word which is currently displayed from the memory 13 and the S/A information is output on the basis of this address and given to the output information synthesizer 17 through the output buffer 18. The synthesizer 17 produces the output information in a manner similar to step S7 and outputs to the display device 4. In step S15, the information output from the synthesizer 17 is displayed by the display device 4.

After step S15, checks are made in steps S16 to S18 to see if a new word has been input, if the RTN key 24 has been depressed, and if the S/A key 22 has been depressed or not, respectively. If YES in these steps, the processing routine is returned to steps S10, S19, and S13. If NO in steps S16 to S18, the processing routine is returned to step S1.

If YES in step S17, step S19 follows and the previous RTN address is output from the word information memory 23 and given to the controller 14. Thereafter, the processing routine advances to steps S7 and S8 as set forth above. Thus, the information of the word which has been output just before the current word can be output.

In accordance with the above processes, by depressing the S/A key 22, the S/A information can be sucessively output. By depressing the RTN key 24, the output state can be returned to the one-preceding display state in accordance with the opposite order. That is, by operating the RTN key 24 or S/A key 22, the operator can know the search history so far. Therefore, this invention can solve problems in conventional apparatuses that the relation between displayed words before and after the search becomes unclear and that the first searched word becomes lost. Furthermore, the troublesome procedure, such as turning over the pages of a dictionary, becomes unnecessary and the study and work can be proceeded by easily referring to the S/A words, conjugation words, or the like upward and downward.

The processes based on the depression of the S/A key 22 have been described above as an example. However, even in the case of depressing the CON key 5, the operator can be informed of the search background by executing the processes similar to those in the case of the S/A key 22.

The case where the display state is returned one by one in response to the depression of the return key 24 in accordance with the depressing order of the S/A key 22 or CON key 5 has been described above as an example. However, it is also possible to construct the apparatus in a manner such that only the address indicative of the head of the word which was searched on the basis of the input word is stored into the word information memory 23 and the output state is returned to the initial display state by depressing the RTN key 24 once. In addition to the above construction, a key to return to the initial display state by the single depression can be also added.

In the embodiment, only the RTN address is stored into the word information memory 23. However, all of the information read out of the memory 13 can be also sequentially stored into the word information memory 23. In such a case, the arithmetic operations of the address upon depression of the RTN key 24 are fairly simplified. However, there are problems such that the memory capacity for the S/A key 22 increases, the search range to which the process can be returned is limited by the capacity for the S/A key 22, and the like.

Although embodiment regarding the English-/Japanese dictionary has been described above, the similar construction can be also applied to other applications such as Japanese/Japanese dictionary, encyclopedia, and the like.

As will be obvious from the above description, according to the present invention, in an electronic dictionary for receiving first language information and outputting second language information corresponding to the first language information, the electronic dictionary comprises: means for inputting first language information; memory means in which second language information corresponding to the first language information is stored; and control means for searching the memory means with respect to the first language information input from the input means to thereby output the corresponding second language information, for sequentially outputting a plurality of second language information regarding the first language information in accordance with the operation of first operating means, and for thereafter outputting at least one of the information output by the first operating means in response to an operation of second operating means in accordance with the opposite order. Therefore, the relative information can be successively extracted by the first operating means and the relative information which have been output so far can be output by the operation of the second operating means in accordance with the opposite order. Thus, the operator can know the search history so far and problems that the relation between words before and after the search becomes unclear or that the first searched word becomes lost can be eliminated. On the other hand, this invention gives excellent advantages that the troublesome procedure, such as turning over the pages of a dictionary is unnecessary, the study and works can be proceeded by easily referring to the S/A words, conjugation words, or the like upward and downward, and the like.

What is claimed is:

1. An electronic dictionary comprising:
   input means for inputting first language information;
   first memory means for storing second language information corresponding to the first language information input by said input means;
   first operating means for instructing the conversion of the input first language information into corresponding second language information stored in said first memory means;
   second operating means for instructing the searching of said first memory for further second language information associated with the converted second language information in sequence;
   second memory means for storing the further second language information together with data representing a sequential order of the searched further language information instructed by said second operating means;
   third operating means for instructing the outputting of the further second language information stored in said second memory means in an order opposite from the sequential order;
   fourth operating means for instructing the outputting of a first one of the further second language information stored in said second memory means; and
   control means for controlling said first memory means to output the converted second language information corresponding to first language information input by said input means in response to the operation of said first operating means and for controlling said second memory means to output the further second language information in response to the operation of said second operating means in the opposite order and for controlling said second memory means to output the first one of the further second language information during the operation of said second or third operating means in response to the operation of said fourth operating means.

2. A dictionary according to claim 1, wherein said first memory means stores at least one of a part of speech, conjugation of a verb, synonyms, and antonyms as the second language information.

3. A dictionary according to claim 1, wherein said second memory means stores addresses of the further second language information stored in said first memory means.

4. A dictionary according to claim 2, wherein said second memory means stores addresses of the further second language information stored in said first memory means.

5. An electronic dictionary comprising:
   a plurality of key input means for inputting first language information;
   first memory means for storing a plurality of second language information corresponding to the first language information input by said key input means;
   a plurality of first operating means each of which corresponds to each of the plurality of second language information for instructing the searching of said first memory means for the plurality of second language information in response to the first language information input by said key input means;
   second memory means for storing the plurality of second language information together with data representing a sequential order of the searched plurality of second language information instructed by said plurality of first operating means;
   second operating means for instructing the outputting of at least a portion of the plurality of second language information stored in said second memory means in an order opposite from the sequential order;
   third operating means for instructing the outputting of a first one of the plurality of the second language information stored in said second memory means; and
   control means for controlling said first memory means to sequentially output the plurality of second language information corresponding to the first language information in response to the operations of said plurality of first operating means, and for controlling said second memory means to output the at least a portion of the plurality of second language information in response to the operation of said second operating means in the opposite order, and for controlling said second memory means to output the first one of the plurality of the second language information during the operation of said plurality of first operating means or said second operating means in response to the operation of said third operating means.

6. A dictionary according to claim 5, wherein said plurality of first operating means include a first key to search a conjugation of a verb and a second key to search relative information such as synonyms, antonyms, or the like.

7. A dictionary according to claim 5, wherein said second memory means stores addresses of the plurality of second language information stored in said first memory means.

8. A dictionary according to claim 6, wherein said second memory means stores addresses of the plurality of second language information stored in said first memory means.

9. An electronic dictionary comprising:

input means for inputting first language information;

first memory means for storing second language information indicative of a grammatical attribute corresponding to the first language information input by said input means or indicative of synonyms and/or antonyms in the same language system as the second language information;

a plurality of first operating means each of which corresponds to each of the second language information stored in said first memory means for instructing the searching of said first memory means for the second language information in response to the first language information input by said input means;

second memory means for storing the second language information together with data relating to a sequential order of the searched second language information instructed by said plurality of first operating means;

second operating means for instructing the outputting of at least one portion of the second language information stored in said second memory means in an order opposite from the sequential order;

third operating means for instructing the outputting of a first one of the second language information stored in said second memory means; and control means for controlling said first memory means to sequentially output the second language information corresponding to the first language information in response to the operating of said plurality of first operating means, and for controlling said second memory means to output the at least a portion of the second language information in response to the operation of said second operating means in the opposite order, and for controlling said second memory means to output the first one of the second language information during the operation of said first or second operating means in response to the operation of said third operating means.

10. A dictionary according to claim 1, further comprising display means, wherein said control means controls said display means to display the second language information or the further second language information.

11. A dictionary according to claim 5, further comprising display means, wherein said control means controls said display means to display the plurality of second language information.

12. A dictionary according to claim 9, further comprising display means, wherein said control means controls said display means to display the second language information.

13. A method of searching a dictionary comprising the steps of:

inputting first language information into an electronic dictionary;

instructing the conversion of the first language information into second language information;

outputting the second language information;

searching a memory for further second language information associated with the second language information output in the output step in a sequential order;

outputting the further second language information in an order opposite from the sequential order, and outputting a first one of the further second language information during said searching step or during said opposite order outputting step.

14. A method according to claim 13, wherein said searching step comprises the step of searching an additional memory for further second language information.

15. A method according to claim 14, wherein said second outputting step comprises the step of reading further second language information from the additional memory.

* * * * *

UNITED STATES PATENT AND TRADEMARK OFFICE
CERTIFICATE OF CORRECTION

PATENT NO. : 5,224,041
DATED : June 29, 1993
INVENTOR(S) : HIDEO FUSHIMOTO

It is certified that error appears in the above-indentified patent and that said Letters Patent is hereby corrected as shown below:

ON COVER PAGE

AT [56] REFERENCES CITED
"4,837,595  6/1989 Pruett et al." should read --4,837,845  6/1989 Pruett et al.--

COLUMN 1
    Line 32, "giving" should read --given--.
    Line 59, "to" should read --of--.

COLUMN 2
    Line 9, "execut-" should be deleted.
    Line 10, "ing" should be deleted.

COLUMN 3
    Line 17, "antonyms" should read --antonym--.

COLUMN 4
    Line 16, "t" should read --the next--.

COLUMN 5
    Line 27, "steps S4." should read --step S4.--.

UNITED STATES PATENT AND TRADEMARK OFFICE
CERTIFICATE OF CORRECTION

PATENT NO. : 5,224,041
DATED : June 29, 1993
INVENTOR(S) : HIDEO FUSHIMOTO

It is certified that error appears in the above-indentified patent and that said Letters Patent is hereby corrected as shown below:

COLUMN 6
    Line 3, "Fig. 4A" should read --Fig. 4A)--.
    Line 40, "be proceeded" should read --proceed--.

COLUMN 7
    Line 3, "embodiment" should read --an embodiment--.
    Line 38, "be proceeded" should read --proceed--.

COLUMN 9
    Line 42, "operating" should read --operations--.

COLUMN 10
    Line 33, "order," should read --order;--.

Signed and Sealed this

Fifteenth Day of March, 1994

Attest:

BRUCE LEHMAN

Attesting Officer     Commissioner of Patents and Trademarks